US012150028B2

(12) United States Patent
Hunt, III et al.

(10) Patent No.: US 12,150,028 B2
(45) Date of Patent: *Nov. 19, 2024

(54) GENERATING AND SENDING AUTOMATED SUPPORT COMMUNICATIONS USING LOCATION DETECTION AND KEYWORD IDENTIFICATION

(71) Applicant: Allstate Insurance Company, Northbrook, IL (US)

(72) Inventors: Wilton Hunt, III, Mooresville, NC (US); Bret M. McDermitt, Charlotte, NC (US); Anna Reifman, Arlington Heights, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,940

(22) Filed: Aug. 1, 2023

(65) Prior Publication Data
US 2024/0031788 A1  Jan. 25, 2024

Related U.S. Application Data

(63) Continuation of application No. 17/397,760, filed on Aug. 9, 2021, now Pat. No. 11,765,566, which is a (Continued)

(51) Int. Cl.
*H04W 4/40* (2018.01)
*G07C 5/00* (2006.01)
(Continued)

(52) U.S. Cl.
CPC ............. *H04W 4/90* (2018.02); *G07C 5/008* (2013.01); *G08G 1/205* (2013.01);
(Continued)

(58) Field of Classification Search
CPC ......... H04M 1/72421; H04M 1/72538; H04W 4/024; H04W 4/44; H04W 4/90;
(Continued)

(56) References Cited

U.S. PATENT DOCUMENTS 10,219,122 B1   2/2019   Scanlon et al.
10,292,036 B1   5/2019   Robinson et al.
(Continued)

OTHER PUBLICATIONS

Jun. 26, 2019—(US) Notice of Allowance—U.S. Appl. No. 16/358,246, 9 Pages.
(Continued)

*Primary Examiner* — Chuong A Ngo
(74) *Attorney, Agent, or Firm* — Polsinelli PC

(57) ABSTRACT

A system including a processor and memory may provide for automated support communications, such as communications with individuals who need assistance. Automated communications may use one or more factors to determine how to adjust communications according to the needs of a user. For example, automated communications may be adjusted based on, e.g., a keyword used by a user in the user's communications, or a location associated with the user's mobile device or user vehicle. Automated communications may be adjusted in timing, frequency, or content. One or more external events (e.g., phone call, dispatch request, additional automated communication) may be triggered based on the automated communications.

20 Claims, 15 Drawing Sheets

Related U.S. Application Data continuation of application No. 16/580,596, filed on Sep. 24, 2019, now Pat. No. 11,089,465, which is a continuation of application No. 16/358,246, filed on Mar. 19, 2019, now Pat. No. 10,470,025.

(51) Int. Cl.
| | | |
|---|---|---|
| *G08G 1/00* | (2006.01) | |
| *G10L 15/18* | (2013.01) | |
| *H04M 1/72421* | (2021.01) | |
| *H04W 4/90* | (2018.01) | |
| *G10L 15/08* | (2006.01) | |

(52) U.S. Cl.
CPC ..... *G10L 15/1822* (2013.01); *H04M 1/72421* (2021.01); *H04W 4/40* (2018.02); *G10L 2015/088* (2013.01)

(58) Field of Classification Search
CPC ............... H04W 4/40; G10L 15/1822; G10L 2015/088; G08G 1/205; G07C 5/008
See application file for complete search history.

(56) References Cited

U.S. PATENT DOCUMENTS

| | | |
|---|---|---|
| 10,470,025 B1 | 11/2019 | Hunt, III et al. |
| 2006/0114531 A1* | 6/2006 | Webb ................ G01N 21/8851 359/15 |
| 2008/0242312 A1 | 10/2008 | Paulson et al. |
| 2017/0053461 A1 | 2/2017 | Pal et al. |
| 2017/0101054 A1 | 4/2017 | Dusane |

OTHER PUBLICATIONS

International Preliminary Report on Patentability for International Application No. PCT/US2020/023506, mailed Sep. 30, 2021, 5 Pages.

International Search Report and Written Opinion for International Application No. PCT/US2020/023506, mailed Apr. 14, 2020, 6 Pages.

* cited by examiner

| Path (702) | Content (704) | Timeframe (706) | Messaging Decision (708) |
|---|---|---|---|
| Digital Messaging – Timed | Hi, I'm your personal roadside assistant. Be back in touch with more information soon! Reply STOP to end messaging. Terms and conditions (termsAndConditionsURL). | 0 seconds | • Have enabled the partner<br>• Status is ongoing, not completed<br>• Provider is digital |  (710)
| Digital Messaging – Timed | Good news! (providerNameTruncated) will be there in (ETAMinutes). In case you need it, the provider's number is (providerNumber). | 1 minute | • Status is ongoing, not completed<br>• Provider is digital | (712)
| Digital Messaging – Timed | Hello, just an update that (providerNameTruncated) is still on track. | 25 minutes | • Status is ongoing, not completed<br>• Provider is digital | (714)
| Digital Messaging – Timed | Thanks so much for your patience. We have confirmed that (providerNameTruncated) is still on track to arrive between (ETARange). | 45 minutes | • Status is ongoing, not completed<br>• Provider is digital | (716)
| Digital Messaging – Trigger (Arriving) | (providerNameTruncated) has told us they're arriving soon. | As soon as digital data is received. | • Digital alert is received | (718)
| Digital Messaging – Trigger (on-site) | (providerNameTruncated) has told us they're on site or arriving soon. Please call (ARSNumber) if we can help with anything. | As soon as digital data is received. | • Digital alert is received | (720)
| Digital Messaging – Trigger (completed) | I hope that we provided exceptional service today. | As soon as digital data is received. | • Digital alert is received | (722)
| Digital Messaging – Trigger (ETA change) | Quick update: the provider has been delayed and is now set to arrive (ETAMinutes). We'll continue working with the provider to ensure the provider remains on track. | As soon as digital data is received. | • Digital alert is received | (724)
| Digital Messaging – Trigger (Provider Change) | Hello, we've been working to find you the best possible service and found another service provider who can better assist you shortly. I'll send more details shortly. | As soon as digital data is received. | • Digital alert is received | (726)

FIG. 7A

| | Path | Content | Timeframe | Messaging Decision |
|---|---|---|---|---|
| 728 | Analog Messaging - Timed | Hi, I'm your personal roadside assistant. Be back in touch with more information soon! Reply STOP to end messaging. Terms and conditions (termsAndConditionsURL). | 0 seconds | • Have enabled the partner<br>• Status is ongoing, not completed<br>• Provider is analog |
| 730 | Analog Messaging - Timed | Good news! (providerNameTruncated) will be there in (ETAMinutes). In case you need it, the provider's number is (providerNumber). | 60 seconds | • Provider is analog |
| 732 | Analog Messaging - Timed | This service provider does not share its ongoing location. We are communicating with the provider and will notify you if needed. | 90 seconds | • Provider is analog |
| 734 | Analog Messaging - Timed | Until (providerNameTruncated) arrives, stay safe and know that you're in good hands. | 105 seconds | • Provider is analog |

1302
- Requires response: 54s
  Company A – Tow
  User 1
- Requires response: 1m04s
  Company A – Tow
  User 2
- Requires response: 32s
  Company C – Tow
  User 3
- Requires response: 45s
  Company A – Lockout
  User 4
- Company A – Tow
  User 5
- Company B – Tow
  User 6

1304

Hi Pam, I'm your personal roadside assistant. I'll be back in touch with more information soon.
Reply STOP to end messaging.

Good news, Pam! Mechanic Shop 1 will be there between 9:45 AM and 10:00 AM. In case you need their number, it's 555-867-5309.

Hi Pam, just wanted to let you know Mechanic Shop 1 is still on their way.

I just tried calling the number you sent but they didn't answer. Do they have another number?

Sorry for your trouble. They have another number listed as 1-800-555-2368. Their courteous and efficient staff is on call 24 hours a day to serve all your vehicular needs. Let me know if you can't reach them.

[Ignore]  [Call]  [Send]

1306

Service Request Details

✓ Assistance successfully dispatched to Mechanic Shop 1.
Notification sent to provider and customer.

Thank you for holding. I have arranged for Mechanic Shop 1 to come out and assist you. They should arrive within 55 minutes, at or around 09:04 AM ET. Their phone number is 555-867-5309. Please remain within the vehicle. I am glad that I was able to assist you today. My name is Omni. Thank you for calling Company A Vehicle Group and I hope your day improves from here.

Customer
User 1

PO
123456789

Estimated Wait Time
55 minutes

Provider
Mechanic Shop 1

Jane Doe
555-867-5309

1640 Riverside Drive
Hill Valley contact@mechanicshop1.com

[Edit]  [Close]

GENERATING AND SENDING AUTOMATED SUPPORT COMMUNICATIONS USING LOCATION DETECTION AND KEYWORD IDENTIFICATION

CROSS-REFERENCE TO RELATED-APPLICATIONS

This application is a continuation of U.S. application Ser. No. 17/397,760, filed on Aug. 9, 2021, which is a continuation of U.S. application Ser. No. 16/580,596, filed on Sep. 24, 2019, which is a continuation of U.S. application Ser. No. 16/358,246, filed Mar. 19, 2019. Each of these applications is incorporated by reference in its entirety herein.

BACKGROUND

The world is filled with people interacting with other people, places, and things. As people go about their daily lives, they encounter difficulties with which they need assistance. For example, a person driving a vehicle may experience a flat tire, run out of gas, or have mechanical issues. Different people also have different communication preferences. For example, some people prefer to talk via telephone, whereas others prefer to send text messages. Thus, there will always be a need for improved methods of communication with individuals, particularly individuals who have difficulties with which they need assistance.

SUMMARY

The following summary is for illustrative purposes only, and is not intended to limit or constrain the detailed description.

Aspects of the disclosure provide effective, efficient, and convenient technical solutions that address and overcome the technical problems associated with automated support communications. In accordance with one or more embodiments, a system, computer-readable media, device, and/or apparatus may be configured to perform a method that includes receiving, from a user device and by a computing device comprising a processor, memory, and a natural language processing system, a text message comprising a request for roadside assistance; receiving, by the computing device, first location information comprising a location of the user device and second location information comprising a location of a vehicle associated with a user of the user device; initiating, by the computing device, roadside assistance for the user in response to the request for roadside assistance; send, by the computing device and to the user device, a first text message comprising status information regarding the roadside assistance for the user; determining, by the computing device, a threshold amount of time within which to send an updated status communication to the user device based on identifying one or more keywords included in the request for roadside assistance or in subsequent communications received from the user device; determining, by the computing device, that the threshold amount of time has passed since sending, to the user device, the first text message comprising status information regarding the roadside assistance for the user; and after determining that the threshold amount of time has passed since sending, to the user device, the first text message comprising status information regarding the roadside assistance for the user, sending, to the user device, a second text message comprising the status information regarding the roadside assistance for the user, the second text message phrased differently than the first text message.

In one or more embodiments, adjusting the threshold amount of time within which to send the updated status communication to the user device based on identifying the one or more keywords included in the request for roadside assistance or in subsequent communications received from the user device may include adjusting the threshold amount of time to a first threshold amount of time based on a first keyword being included in the one or more keywords included in the request for roadside assistance or in subsequent communications received from the user device, and adjusting the threshold amount of time to a second threshold amount of time based on a second keyword being included in the one or more keywords included in the request for roadside assistance or in subsequent communications received from the user device.

In one or more embodiments, the method may include determining a number of text messages sent to the user device; and determining, based on the number of text messages sent to the user device, a phrasing for a subsequent text message comprising the status information regarding the roadside assistance for the user.

In one or more embodiments, the method may include identifying, by the computing device, a trigger keyword in a text message received from the user device; and responsive to identifying the trigger keyword in the text message received from the user device, initiating, by the computing device, a phone call to the user device from a customer-support device. In one or more embodiments, identifying the trigger keyword in the text message received from the user device may include identifying a trigger keyword that is associated with a dangerous or life-threatening situation. In one or more embodiments, identifying the trigger keyword in the text message received from the user device may include identifying a trigger keyword that is associated with a lack of understanding by the user. In one or more embodiments, the method may include sending, to an interface associated with the customer-support device, a transcript of a text message conversation between the computing device and the user device.

In one or more embodiments, the method may include, after the roadside assistance for the user has been completed, determining, by the computing device, whether to send a first follow-up message to the user device or a second follow-up message to the user device based on the one or more keywords included in the request for roadside assistance or in the subsequent communications received from the user device. In one or more embodiments, the method may include, after the roadside assistance for the user has been completed, determining, by the computing device, whether to send a follow-up message to the user device via a first communication method or via a second communication method based on the one or more keywords included in the request for roadside assistance or in the subsequent communications received from the user device. In one or more embodiments, the method may include, after the roadside assistance for the user has been completed, determining, by the computing device, whether to send a follow-up message to the user device within a first period of time or within a second period of time based on the one or more keywords included in the request for roadside assistance or in the subsequent communications received from the user device.

In one or more embodiments, the method may include triggering a fraud alert based on the one or more keywords included in the request for roadside assistance or in the subsequent communications received from the user device. In one or more embodiments, the method may include triggering a fraud alert based on comparing the one or more keywords included in the request for roadside assistance or in the subsequent communications received from the user device against information obtained from a different source and regarding a location of the user device. In one or more embodiments, the information obtained from the different source and regarding the location of the user device may include weather information regarding the location of the user device.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying drawings in which like numerals indicate similar elements.

FIGS. 7A-7B depict illustrative automated support communications according to at least one embodiment described herein.

FIG. 13 depicts an illustrative support provider application graphical user interface for automated support communications according to at least one embodiment described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
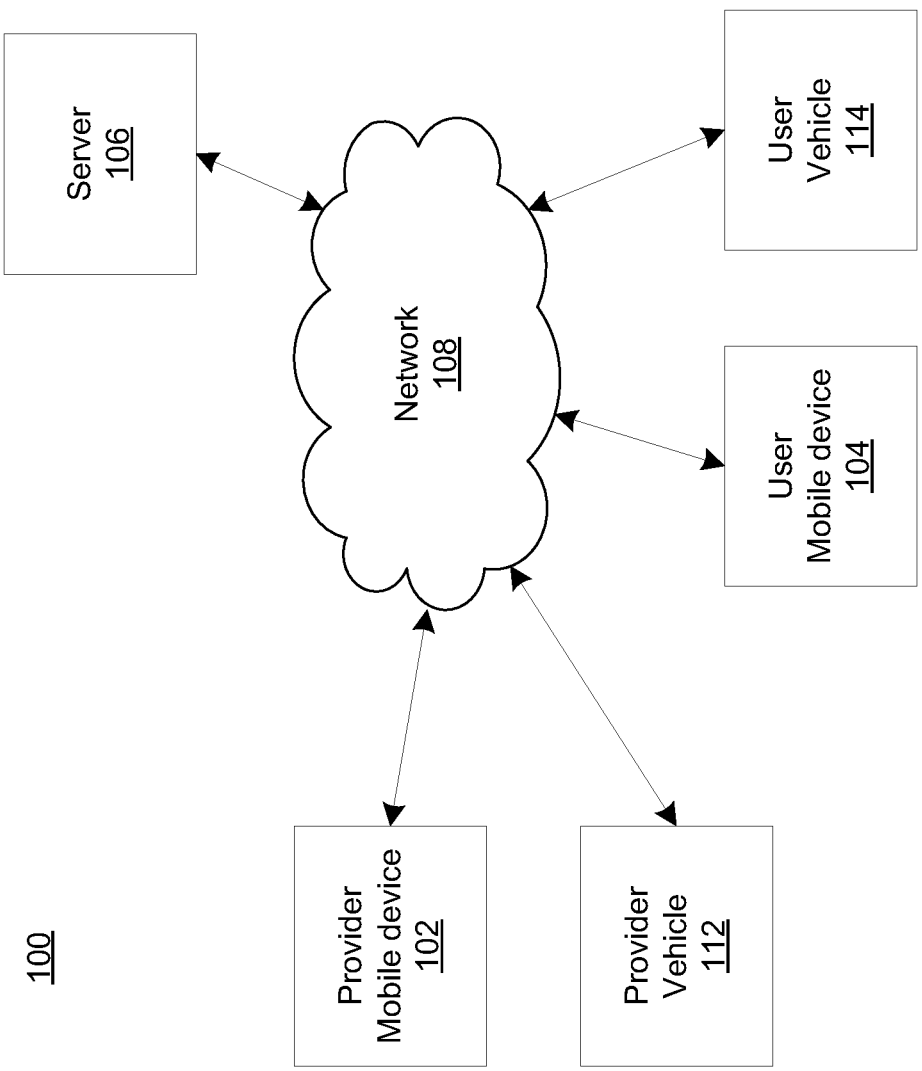
FIG. 1 is an illustrative diagram of an environment in which automated support communications may be implemented according to at least one embodiment described herein.

FIG. 1 depicts an illustrative block diagram of a computing environment in accordance with one or more features described herein. Various connections between elements are discussed in the following description. These connections are general and, unless specified otherwise, may be direct or indirect, wired or wireless, and that the specification is not intended to be limiting in this respect.

A computing environment (e.g., computing environment 100) may include a user vehicle (e.g., vehicle 114), a user mobile device (e.g., mobile device 104), a provider vehicle (e.g., vehicle 112), a provider mobile device (e.g., mobile device 102), and/or a server (e.g., server 106). One or more of vehicle 112 and/or vehicle 114 may include at least one computing device.

In one or more arrangements, one or more of the computing device(s) included in vehicle 112, vehicle 114, mobile device 102, mobile device 104, and/or server 106 may be any type of computing device capable of receiving, generating, and/or displaying a user interface, receiving input via the user interface, and communicating the received input to one or more other computing devices. For example, a computing device included in vehicle 112, vehicle 114, mobile device 102, mobile device 104, and/or server 106 may, in some instances, be and/or include server computers, desktop computers, laptop computers, tablet computers, smart phones, personal digital assistants, pagers, or the like. Any and/or all of a computing device included in vehicle 112, vehicle 114, mobile device 102, mobile device 104, and/or server 106 may, in some instances, be or include special-purpose computing devices configured to perform specific functions.

A mobile device of a user (e.g., mobile device 104) may be configured to execute one or more computer-executable applications. The one or more computer-executable applications may be installed on a mobile device of the user. The one or more computer-executable applications may be downloaded to the mobile device from an public or private application store or catalog, may be directly installed onto the mobile device, and/or may be installed using a mobile device management system. The one or more computer-executable applications may work with all of the features described herein, or may work with a subset of the features.

Computing environment 100 also may include one or more networks, which may interconnect one or more of vehicle 112, vehicle 114, mobile device 102, mobile device 104, and/or server 106. For example, computing environment 100 may include network 108, as depicted in FIG. 1. Network 108 may include one or more sub-networks (e.g., local area networks (LANs), wide area networks (WANs), or the like). Network 108 may be associated with a particular organization (e.g., a corporation, educational institution, governmental institution, or the like) and may interconnect one or more computing devices associated with the organization. Network 108 may be a home network, a corporate network, an ad-hoc network, a ring network, a cellular network, or another type of network. Network 108 may be the Internet.

Figure 2:
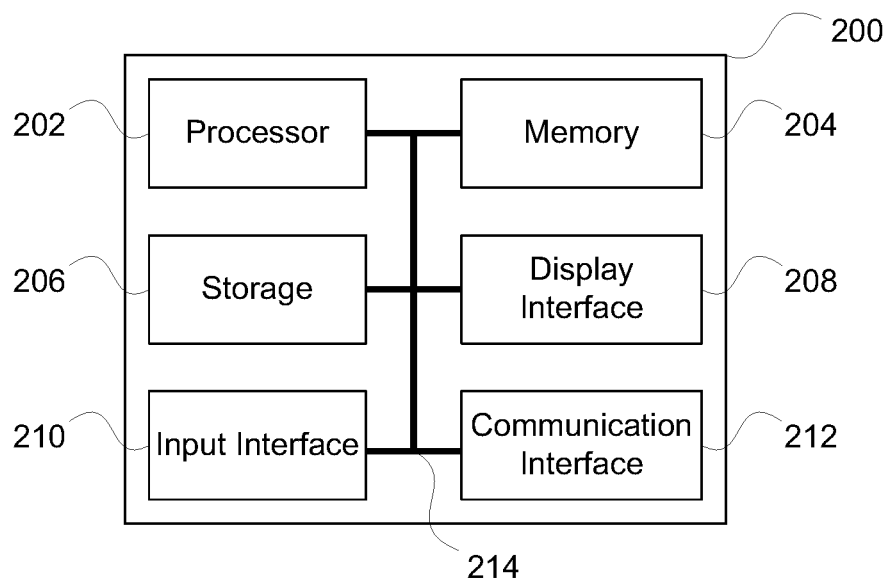
FIG. 2 is an illustrative block diagram of a system that may be used in providing automated support communications according to at least one embodiment described herein.

FIG. 2 illustrates computing device 200, which may be similar to mobile device 102, mobile device 104, server 106, a computing device in vehicle 112, and/or a computing device in vehicle 114. Computing device 200 may include one or more processor(s) 202, memory(s) 204, storage(s) 206, display interface(s) 208, input interface(s) 210, and/or communication interface(s) 212. A data bus (e.g., data bus 214) may interconnect processor(s) 202, memory(s) 204, storage(s) 206, display interface(s) 208, input interface(s) 210, and communication interface(s) 212. Communication interface(s) 212 may be a network interface configured to support communication between computing device 200 and one or more devices and/or networks. Communication with other devices via communication interface(s) 212 may be direct (e.g., using BLUETOOTH, near-field communication (NFC), WIFI, AIRDROP, or the like) or indirect (e.g., via one or more other devices).

Memory(s) 204 and/or storage(s) 206 may include a hard drive, solid state drive, flash memory, random-access memory (RAM), read-only memory (ROM), removable storage, NFC tag, or the like. Memory(s) 204 may include one or more program modules having instructions that, when executed by processor(s) 202, cause computing device 200 to perform one or more functions described herein and/or one or more databases that may store and/or otherwise maintain information that may be used by such program modules and/or processor(s) 202. In some instances, the one or more program modules may be stored by and/or maintained in different memory units of computing device 200 and/or by different devices that may form and/or that are connected to or in communication with computing device 200. For example, the instructions may include instructions that cause computing device 200 to execute a computer-executable application that receives, processes, and stores data received from one or more computing devices.

Display interface(s) 208 may include a display output port (e.g., analog video, digital video, VGA, HDMI, Display-Port), and/or a connection to an internal or external display. Input interface(s) 210 may include one or more ports for receiving input via a keyboard, mouse, stylus, touchpad, touchscreen, or other input device. Input interface(s) 210 may be integrated with or otherwise correspond with display interface(s) 208 (e.g., such as in a touch, multi-touch, or similar environment).

Figure 3:
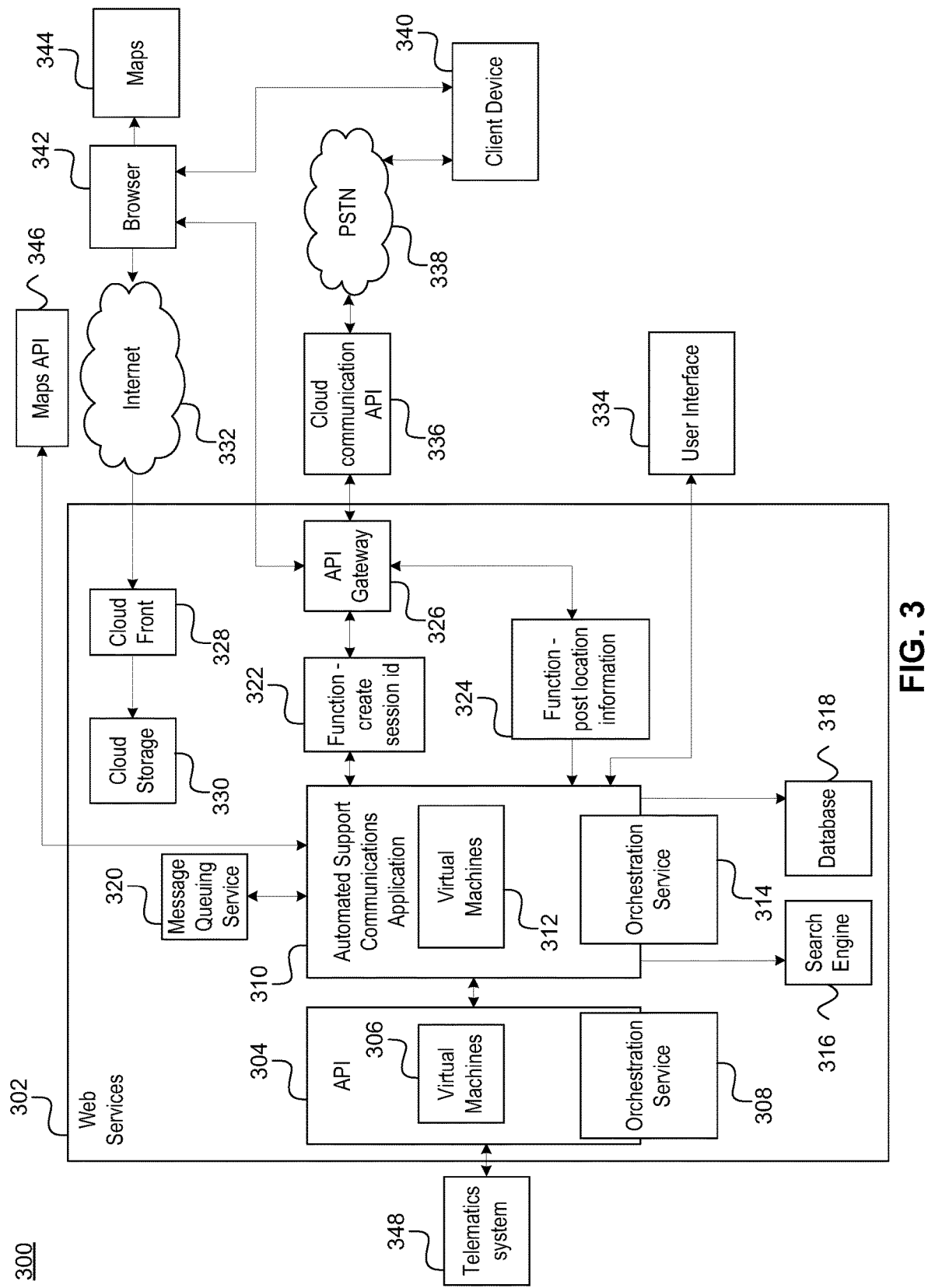
FIG. 3 is an illustrative block diagram of a computing environment in which automated support communications may be implemented according to at least one embodiment described herein.

FIG. 3 depicts an illustrative computing environment 300 in which an automated support communications system may be implemented. Computing environment 300 may include a web services platform 302, which may include various cloud services that may be used by an automated support communications system. For example, web services platform 302 may include application program interface (API) 304, which may include one or more virtual machine instances 306. API 304 may allow an outside service, such as telematics system 348, to make information requests and receive information in response to those information requests. API 304 may include an orchestration service 308.

Web services platform 302 may include one or more instances of an automated support communications application 310, which may include one or more virtual machine instances 312. Automated support communications application 310 may include an orchestration service 314. Automated support communications application 310 may communicate with a search engine 316 (e.g., to search for historical communications, to search for a nearby service provider). Automated support communications application 310 may communicate with database 318 (e.g., to obtain information to use during automated support communications, to store information received during automated support communications). Automated support communications application 310 may communicate with a message queuing service 320, which may queue one or more messages received and waiting to be processed by automated support communications application 310. Automated support communications application 310 may communicate with a maps API 346, which may provide map information to automated support communications application 310. Automated support communications application 310 may communicate with user interface 334, which may allow information regarding a support session to be inputted and outputted. Automated support communications application 310 may communicate with one or more custom functions, such as function 322 (a create session identifier function) and/or function 324 (a post location function). One or more custom functions may communicate with an API gateway 326, which may allow outside services (e.g., cloud communication API 336) to communicate with web services platform 302. API gateway 326 may direct incoming function execution requests to an appropriate custom function. A public switched telephone network (PSTN) 338 may communicate with cloud communication API 336, and allow a mobile device (e.g., client device 340) to communicate with cloud communication API 336. Client device 340 may use a browser 342 to communicate with one or more services, such as maps service 344 or other network (e.g., Internet 332) communications or services. For example, web services platform 302 may include a cloud front 328, which may provide an interface by which internet-connected devices communicate with cloud features of web services platform 302. Cloud front 328 may provide access, for example, to cloud storage 330, which may store cloud-accessible data in one or more storage devices.

Figure 4:
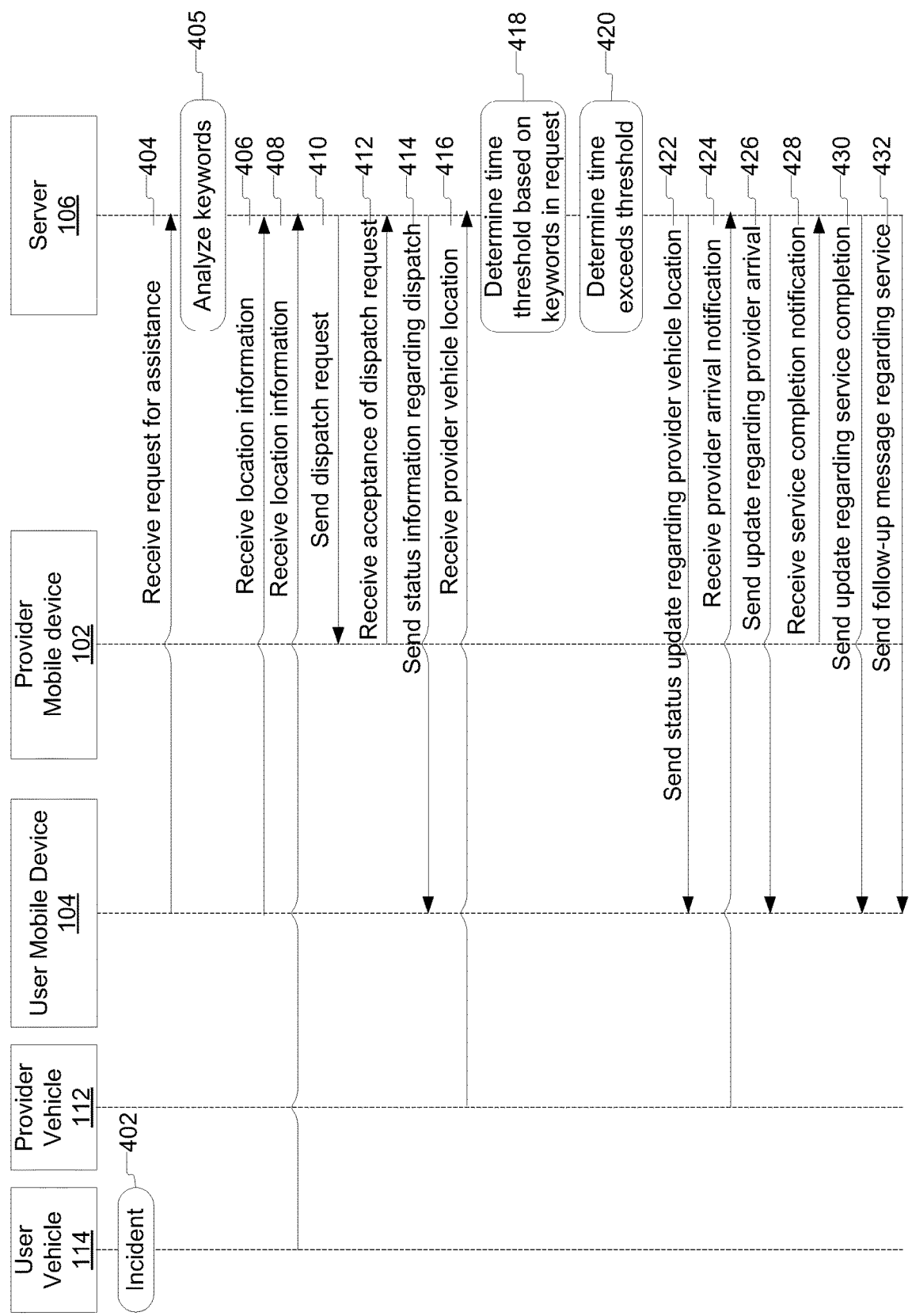
FIG. 4 is an illustrative system flow diagram according to at least one embodiment described herein.

FIG. 4 depicts an illustrative flow diagram of a method of generating and sending automated support communications using location detection and keyword identification.

In step 402, a vehicle (e.g., vehicle 114) may experience an incident (e.g., flat tire, lockout, accident, running out of gas, break-in, mechanical issue). The vehicle may be equipped with one or more on-board computers that automatically detects the incident, and notifies one or more different computing devices (e.g., mobile device 104, server 106) of the incident. Alternatively or additionally, a user (e.g., a driver or owner associated with vehicle 114) may send a notification of the incident. In step 404, a mobile device (e.g., mobile device 104) may send a request for assistance (e.g., a text message with a request for roadside assistance).

In step 405, server 106 may analyze the request for assistance and/or subsequent communications received from the user device (e.g., mobile device 104) to identify one or more keywords in the request for assistance and/or in the subsequent communications received from the user device. Server 106 may compare words to a keyword list, and take subsequent action based on actions that are linked to the keywords in the keyword list. In one or more embodiments, one or more words that have linked actions may be trigger keywords (e.g., keywords that trigger actions or events). For example, a trigger keyword may be a keyword that is associated with a dangerous or life-threatening situation, a keyword that is associated with a lack of understanding by the user, a keyword that is associated with fraud, a keyword that is associated with the user being sad, mad, frustrated, impatient, happy, or the like. A linked action may be, for example, a phone call to a user device from a customer-support device. A linked action may be adjusting a threshold amount of time before a status update is sent to the user. A linked action may be adjusting a phrasing for a future communication sent to the user. A linked action may be sending a transcript of the automated communications with the user to a customer-support device. A linked action may be generating a flag to send a follow-up message to the user after the requested assistance has been completed, and then later sending the follow-up message to the user after the requested assistance has been completed. A linked action may be determining whether to send a follow-up message within a first time period or within a second time period. A linked action may be sending a later communication to the user via a different communication method. A linked action may be triggering a fraud alert. A linked action may be comparing the communications received from the user against information obtained from a different source and/or regarding a location of the user device. A linked action may be comparing weather information from a different source and corresponding to the location of the user device to weather information corresponding to the keywords received from the user. For example, if a user communication indicates that it is raining where the user's vehicle is, the system may compare the user's report of rain to a weather report corresponding to the user vehicle location (which may or may not indicate that it is raining).

In step 406, server 106 may receive location information for the mobile device 104. In step 408, server 106 may receive location information for vehicle 114. The location information (e.g., location information for mobile device 104, location information for vehicle 114) may include a global positioning system (GPS) location, latitude/longitude, geographic coordinates, an address, or the like. The location information may be determined using a GPS device, a computing device, a mobile phone, a vehicle navigation system, a device with a geographic information system (GIS), or the like. The location information may be a location of a vehicle, a person, a computing device, a building, an address, a point on a map, or the like.

After receiving location information for mobile device 104 and/or vehicle 114, server 106 may initiate roadside assistance for the user in response to the request for roadside assistance. For example, in step 410, server 106 may send a dispatch request to a device (e.g., mobile device 102) associated with a provider (e.g., a service provider). The service provider may be a provider that provides assistance with vehicle incidents (e.g., flat tire repair, lockout assistance, gas cans, break-in repairs, mechanical repairs). In one or more aspects, server 106 may send the dispatch request to multiple service providers. In step 412, server 106 may receive confirmation from the device associated with the provider that the dispatch request was received and that the provider is available to handle the request. In one or more embodiments, the acceptance of the dispatch request may be sufficient to assign the dispatch request to the service provider. Alternatively, in one or more embodiments, server 106 may send a return confirmation to the service provider to confirm that the service provider has been assigned the service request.

Server 106 may evaluate one or more factors when determining whether to confirm the service request to a particular service provider. For example, if multiple service providers are available, server 106 may confirm the service request to the particular service provider that has a service vehicle closest to the location of the user's vehicle (e.g., vehicle 114). Server 106 may confirm the service request to the cheapest service provider. Server 106 may confirm the service request to the service provider with the highest number of online reviews, the highest average rating in online reviews, or some combination of number of online reviews and average rating in online reviews. Server 106 may confirm the service request to the service provider that has a shop with a nearest location to the user's home address. Server 106 may confirm the service request to the service provider preferred by the user (e.g., the user may have a profile that indicates one or more preferred service providers or brands of service provider). Server 106 may use any combination of one or more factors when determining whether to confirm the service request to a particular service provider.

In step 414, server 106 may send, to the user's mobile device (e.g., mobile device 104) a message with status information regarding dispatch of the service provider. The status information regarding the dispatch of the service provider may include, for example, information regarding a name of the service provider, a name of an employee of the service provider (e.g., a name of an employee that has been dispatched to assist the user), contact information for the service provider, a location of the service provider (e.g., an address of a shop), or the like. Thus, server 106 may establish contact with the user early on to help the user feel that an organization associated with server 106 cares about the user.

In step 416, server 106 may receive information regarding a location of a vehicle associated with the service provider. For example, server 106 may receive a notification that a repair or service vehicle is still at the shop, is in transit to the user's vehicle location, has arrived at the user's vehicle location, has finished the service request, or the like. Server 106 may send a notification to the user's mobile device (e.g., mobile device 104), notifying the user of the location of the vehicle associated with the service provider. The message may include a location of the service provider's vehicle, a name of the service provider, an estimated time of arrival of the service provider, a departure time of the service provider, an estimated distance away of the service provider's vehicle from the user's vehicle, or the like.

In step 418, the server may determine a time threshold in which to send a status update to the user regarding the service request. The server may determine the threshold amount of time within which to send an updated status communication to the user device based on identifying one or more keywords included in the request for roadside assistance or in subsequent communications received from the user device. For example, if the user uses keywords associated with being upset or unhappy (e.g., "I'm upset," "I'm unhappy," "I'm mad," "I'm angry," "this is lame"), scared (e.g., "I'm scared," "this is scary," "I'm really freaked out"), or sad (e.g., "I'm sad," "I'm so sad"), the server may determine a shorter threshold amount of time within which to send a status update regarding the service request. Similarly, if the user uses keywords associated with the user waiting at the vehicle (e.g., "I'm waiting here," "I'm stranded," "I'm not leaving my vehicle"), the server may determine a shorter threshold amount of time within which to send a status update regarding the service request. Alternatively, the server may determine a longer threshold amount of time within which to send a status update regarding the service request if the user uses keywords associated with calmness or patience (e.g., "take your time," "no rush," "everything is fine here," "I'm ok," "see you when you get here"). Similarly, the server may determine a longer threshold amount of time within which to send a status update regarding the service request if the user uses keywords associated with the user leaving the vehicle (e.g., "I'm going to grab a coffee," "I'm going to get lunch," "I'm at work and my car is in the parking lot," "I'm at home," "I'm just going to browse the stores around here while I wait"). The server may determine a longer threshold amount of time within which to send a status update regarding the service request if the user uses keywords associated with not wanting frequent status updates (e.g., "I don't need such frequent status updates," "just tell me when they get to my car," "I have limited texts"). Thus, server 106 may adaptively determine how frequently to send status updates to the user regarding the service request.

In step 420, server 106 may determine that an amount of time since the last status update was sent exceeds the threshold determined for the user. In step 422, server 106 may send a new status update regarding the service request. For example, the status update may inform the user that the service provider is still at the shop, is on the road, is almost to the user's location, or the like. The status update may be phrased differently than a previous status update, even if the status has not changed. For example, a first status update may say, "Our service partner is on the way and will be there soon!" A second status update may say, "Just checking in to let you know that we care! Our service partner is still en route. We'll keep you posted!" As another example, a first status update may say, "Our service partner is on the way and will be there in about 15 minutes." A second status update 10 minutes later may say, "Thanks for your patience! Our service partner is still en route, and is about 5 minutes away." The status updates may be phrased differently to give the user an impression of natural language communications, rather than communicating with a bot. By sending one or more (e.g., a series) of informative messages to the user during the user's wait period, the user's anxiety may be eased.

In addition to sending time-threshold based status updates, server 106 may send immediate status updates as they become available (e.g., as the status changes). For example, if a user is waiting for a tow truck, server 106 may send a status update based on the tow truck leaving the shop, even if the time threshold for sending a status update has not been achieved. After sending the status update, a timer for determining whether the threshold time has been achieved may be reset. This may help avoid sending too many status update messages, which may overwhelm the user. If there has not been a status change for the threshold amount of time, server 106 may send a status update based on the time exceeding the threshold.

In step 424, server 106 may receive a notification that the service provider has arrived at the location of the user vehicle (e.g., vehicle 114). The notification may be automatic (e.g., provider mobile device and/or a computer associated with provider vehicle may determine that a location of the provider mobile device and/or the provider vehicle is the same as a location of the user's vehicle, and send the notification automatically), or the notification may be manual (e.g., a provider operating the provider's mobile device may check in on an app, send a message, or the like).

In step 426, server 106 may send, to the user's mobile device (e.g., mobile device 104), a message with an update regarding arrival of the service provider at the location of the user's vehicle. In some incidents, the user may stay with the vehicle, but in other incidents, the user might not stay with the vehicle. Thus, the user may be notified that the service provider has arrived at the user's vehicle, even if the user is not with the user's vehicle.

In step 428, server 106 may receive a notification from the service provider that service is complete. For example, server 106 may receive a notification from the service provider that a flat tire has been changed, an empty gas tank has been refilled, a mechanical issue has been completed, a vehicle has been towed to a different location, or the like. In step 430, server 106 may send a notification to the user's mobile device (e.g., mobile device 104) that the service has been completed. Thus, the user may be notified that the service to the vehicle has been completed, even if the user is not with the user's vehicle.

In step 432, server 106 may send a follow-up message regarding the service the user received. The follow-up message may be a request for feedback on the user's experience with the service provider, or may simply be a friendly message to check in and let the user know the user is taken care of (e.g., "Just letting you know we're glad you're safe and everything went well with your car service the other day. Have a great day!").

Figure 5:
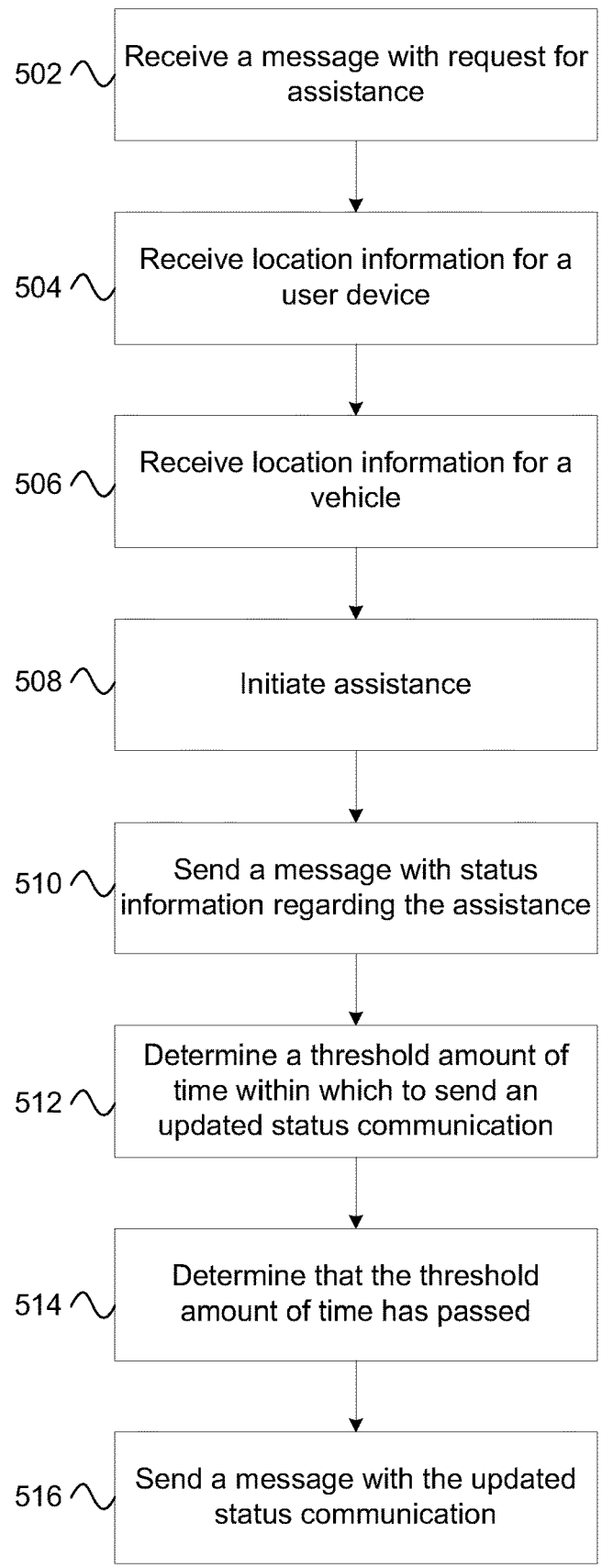
FIG. 5 is an illustrative flow diagram according to at least one embodiment described herein.

FIG. 5 depicts an illustrative flow diagram of a method of generating and sending automated support communications using location detection and keyword identification.

In step 502, a computing device comprising a natural language processing system may receive, from a user device, a text message comprising a request for roadside assistance. In step 504, the computing device may receive first location information comprising a location of the user device. In step 506, the computing device may receive second location information comprising a location of a vehicle associated with a user of the user device.

In step 508 the computing device may initiate roadside assistance for the user in response to the request for roadside assistance. In step 510, the computing device may send, to the user device, a first text message comprising status information regarding the roadside assistance for the user.

In step 512, the computing device may determine a threshold amount of time within which to send an updated status communication to the user device based on identifying one or more keywords included in the request for roadside assistance or in subsequent communications received from the user device. In step 514, the computing device may determine that the threshold amount of time has passed since sending, to the user device, the first text message comprising status information regarding the roadside assistance for the user. In step 516, the computing device may, after determining that the threshold amount of time has passed since sending, to the user device, the first text message comprising status information regarding the roadside assistance for the user, send, to the user device, a second text message comprising the status information regarding the roadside assistance for the user, the second text message phrased differently than the first text message.

Figure 6:
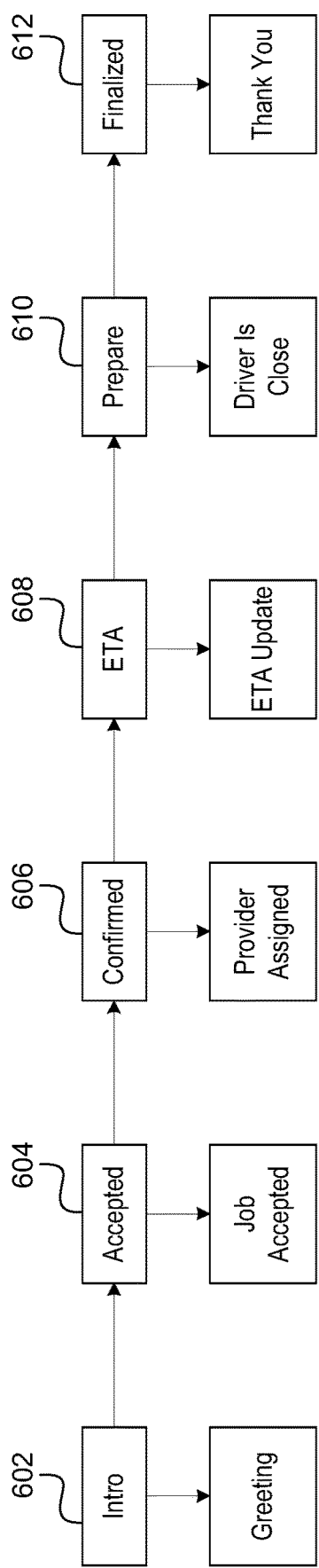
FIG. 6 is an illustrative diagram of automated support communication phases according to at least one embodiment described herein.

FIG. 6 depicts an illustrative diagram of different stages of automated support communications with a user. Automated support communications with a user may occur in one or more stages, the length of each of which may depend on the specific facts of an incident the user is receiving support for. For example, if a user's vehicle is far away from a service center, the estimated time of arrival stage may be longer than if the user's vehicle is close to the service center, as it might take less time for a support vehicle to travel from the service center to the user's vehicle location. As illustrative examples, automated support communication stages may include an introductory stage, an accepted stage, a confirmed stage, an estimated time of arrival stage, a preparation stage, and a finalized stage.

Communications from a user may be used to personalize the automated support communication experience. For example, if the user asks a question, the automated support communication may provide information in answer to the user's question that the automated support communication might not have otherwise provided if the user had not asked the question. As another example, communications from the user may be used to advance the support process. For example, if the user is waiting for a support vehicle to arrive, and the user sends a communication indicating that the support vehicle has arrived, the automated support communications may advance from a stage where the automated support communications correspond to waiting for a support vehicle to arrive to a stage where the automated support communications correspond to a support vehicle having already arrived.

Multiple communications may be sent within a particular stage, the timing of which may be based on one or more factors, such as keywords in communications received from the user, time since the last update message was sent, time since the last status change, or the like. For example, if a threshold amount of time has passed since the most recent status update message was sent, another status update may be sent so that the user feels the user is being taken care of.

During an introduction stage 602, automated support communications may include one or more messages with one or more of a greeting, a customer first name, an acknowledgement of a service request, an acknowledgement of a service time, an estimated time of arrival, or the like. For example, an illustrative communication in the introduction stage 602 may say, "Hi {User Name}, I'm Ari, your Artificial Roadside Intelligence. I'm here to help with your rescue today. I'm reaching out to our nearest provider. To track your {service type}, you can visit {service tracking web site}."

During an accepted stage 604, automated support communications may include one or more messages with communications regarding acceptance of a job associated with the service request. The acceptance communication may indicate an acknowledgement of a type of service, a speed of service, a time of service, or the like. If a service request is not being accepted, communications regarding the non-acceptance of the service request and/or any reasons for not accepting may take place during this stage.

During a confirmed stage 606, automated support communications may include one or more messages with information regarding one or more of an assigned provider, contact information for the assigned provider, or the like. An illustrative example message may say, "Hi, {First Name}, {Provider Name} is assigned to your {service type} and is ready to help with your rescue."

During an estimated time of arrival stage 608, automated support communications may include one or more messages with information regarding one or more of an estimated time of arrival update, vehicle preparation requests, personal items preparation requests, or the like. An illustrative example message may say, "{Service Provider} is estimated to arrive in {x} minutes. In the meantime, if you have questions, call your provider at {Service Provider Contact Phone Number}." As another illustrative example, if some time passes (e.g., 10 minutes), an example message may say, "{Driver Name} is close to you and is getting there in a few minutes. Make sure you gather any belongings you're going to want to have." Yet another illustrative example may say, "{Driver Name} will be arriving in {x} minutes. Tap here to track: {service tracking website}." Thus, a second communication with status information regarding the roadside assistance for the user may be phrased differently than a first communication with status information regarding the roadside assistance for the user.

During a preparation stage 610, automated support communications may include one or more messages with information regarding, for example, driver tracking (e.g., GPS location). An illustrative example message may say, "Your provider should be onsite or pulling up within the next couple of minutes. When the truck pulls up, please reply 'ARRIVE' so that I have a confirmation from you."

During a finalized stage 612, automated support communications may include one or more messages regarding one or more of a thank-you for using a service provider, an experience survey regarding the support experience, an offer for one or more new services based on the service experience, or the like. For example, if a user did not have towing coverage during an incident, and needed assistance with a tow, automated support communications may provide a quote or offer for towing coverage in the future. As another example, the messages may thank the user for the user's use of the service or loyalty to the service. An illustrative message may say, "{User Name}, thank you for using {Brand Name} Roadside Assistance. We're glad we were able to help. We appreciate it if you rate your experience by answering the following question: {Survey Question}."

FIGS. 7A-7B depict illustrative messages that may be sent to a user's mobile device by an automated support communications system. Automated support communications may be associated with one or more support paths 702, which may be determined according to one or more factors (e.g., communication capabilities of a provider, communication capabilities of a user, communication capabilities of the automated support communications system, location tracking capabilities of the provider, location tracking capabilities of the user). For example, a provider may be capable of digital messaging (e.g., messages 710-726 of FIG. 7A) or analog messaging (e.g., messages 728-734 of FIG. 7B).

Automated support communications may include different content 704, which may be determined based on a timeframe 706 and/or one or more messaging decision factors 708. A messaging decision factor may include, for example, if a partner vendor or provider has agreed to participate in automated support communications, if an assistance request is ongoing and not completed, if a provider has digital communication capabilities, if a provider has digital location tracking capabilities, if a provider has analog communication capabilities, if a digital alert has been received, or the like.

One or more messages (e.g., messages 710-716, messages 728-734) may be sent according to a time elapsed since a most recent status update was sent. After a time threshold (e.g., timeframe 706) has elapsed since the most recent status update, a status update message may be sent. One or more messages (e.g., messages 718-726) may be sent based on a trigger event, such as a provider arriving at a customer vehicle location, a provider being on-site at a customer vehicle location, a provider completing service, a change to an estimated time of arrival, a change to a service provider, or the like.

Figure 8:
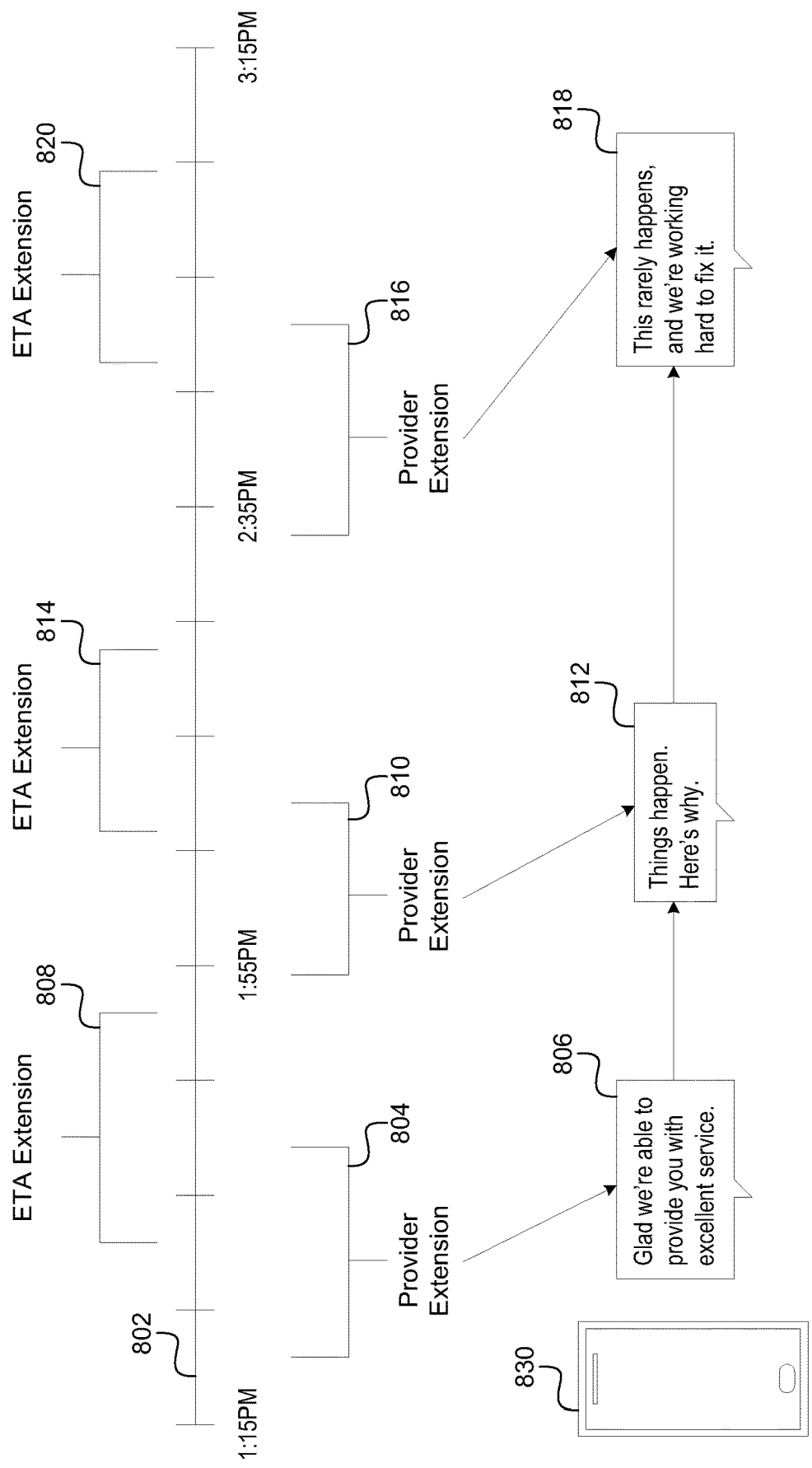
FIG. 8 depicts an illustrative automated support communication timeline according to at least one embodiment described herein.

FIG. 8 depicts an illustrative timeline 802 of a user's service request and automated support communications corresponding to the user's service request. The user may make a request for service at a first time (e.g., 1:15 PM). A service provider may be assigned to provide assistance to the user. The service provider may send a notification indicating an amount of time 804 that the service provider estimates it needs to provide the service. In response to the time from the service provider, an automated support communications system may send a message 806 with a status update to a mobile device of the user (e.g., mobile device 830). The system may update an estimated time of arrival 808. After a period of time has passed, the service provider may provide an update regarding an estimated amount of time 810 required to provide the service. After receiving the updated time from the service provider, the automated support communications system may send a message 812 with a status update to the mobile device of the user. The system may update the estimated time of arrival 814. After another period of time has passed, the service provider may provide an update regarding an estimated amount of time 816 required to provide the service. After receiving the updated time from the service provider, the automated support communications system may send a message 818 with a status update to the mobile device of the user. The system may update the estimated time of arrival 820.

Figure 9A:
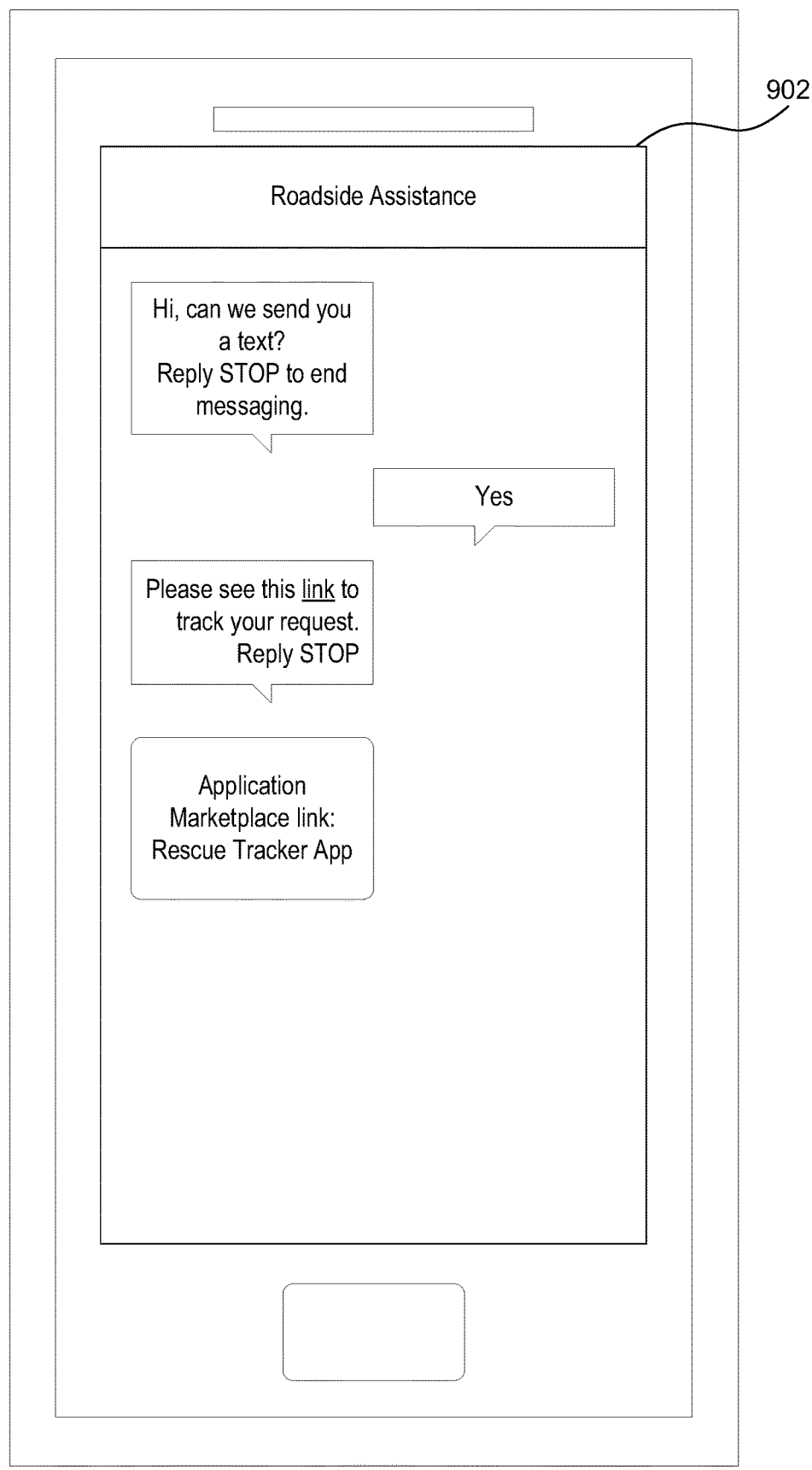
FIGS. 9A-9B depict illustrative automated support communications according to at least one embodiment described herein.
Figure 9B:
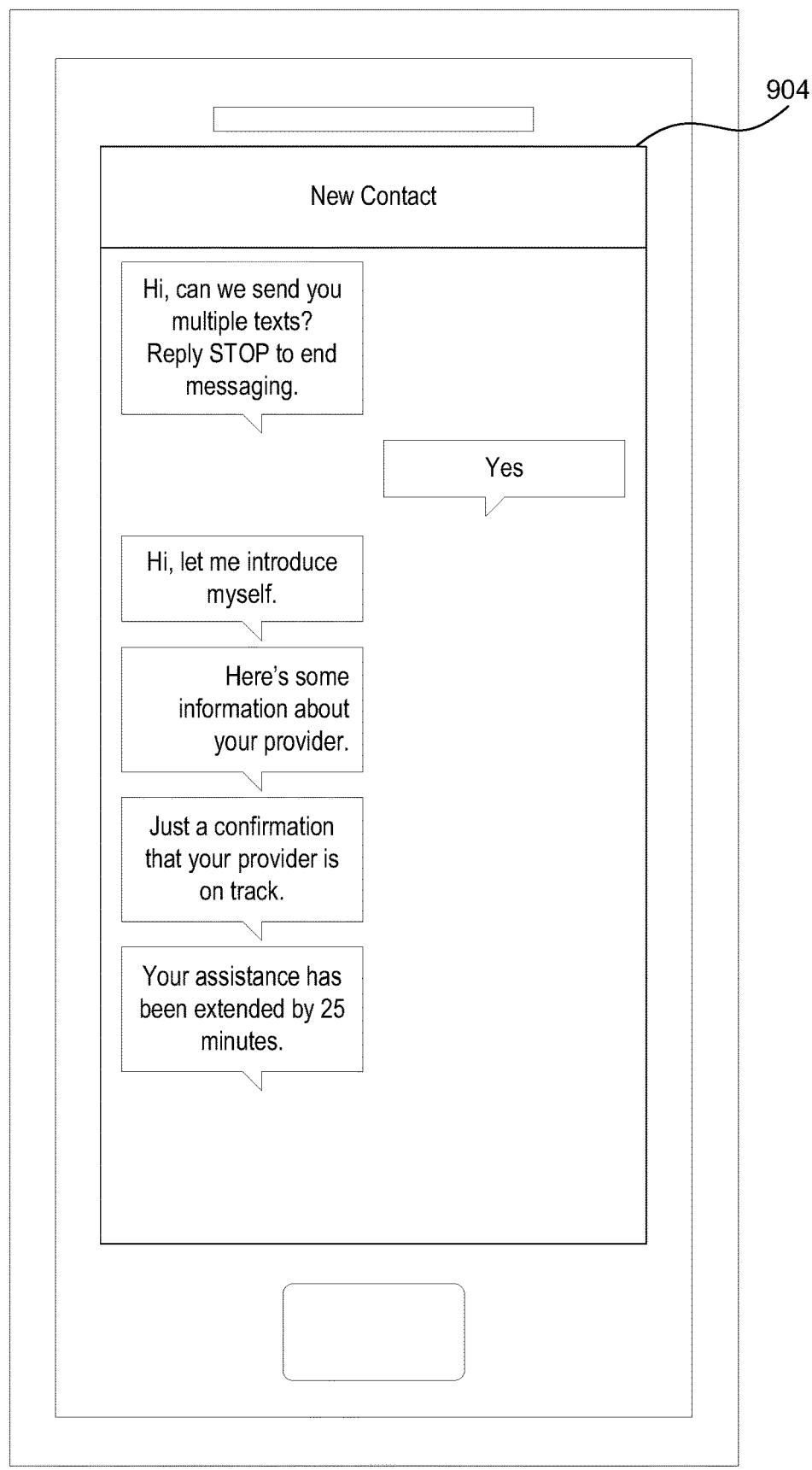

FIGS. 9A-9B depict illustrative automated support communication conversations between an automated support communications system and a user.

In FIG. 9A, conversation 902 represents an example conversation between a user with an existing service request and an automated support communications system. The user may have requested service assistance via a first method (e.g., an app, a phone call, a fax, a page, an email, in-person, text message), and the automated support communication system may provide updates to the user via a second method (e.g., text message, in-app messaging). Conversation 902 may include the automated support communication system asking for the user's consent to send one or more text messages, and giving the user an option to stop text messages. Conversation 902 may include a link (e.g., an HTML link) to a website where a user can track a status of the user's service request. Conversation 902 may include a link to a support application (e.g., available via an application marketplace). The support application may allow the user to track the status of the user's service request.

In FIG. 9B, conversation 904 represents an example conversation between a user with a new service request and an automated support communications system. The user may have requested service assistance via a first method (e.g., an app, a phone call, a fax, a page, an email, in-person, text message), and the automated support communication system may provide updates to the user via a second method (e.g., text message, in-app messaging). Conversation 904 may include the automated support communication system asking for the user's consent to send one or more text messages, and giving the user an option to stop text messages. The automated support communication system may introduce itself to the user. The automated support communication system may provide information about the user's service provider. The automated support communication system may send one or more service updates, such as updates regarding an estimated time of arrival of the dispatched service provider, extensions of time regarding the estimated time of arrival of the dispatched service provider, changes to the service provider, or the like.

Figure 10:
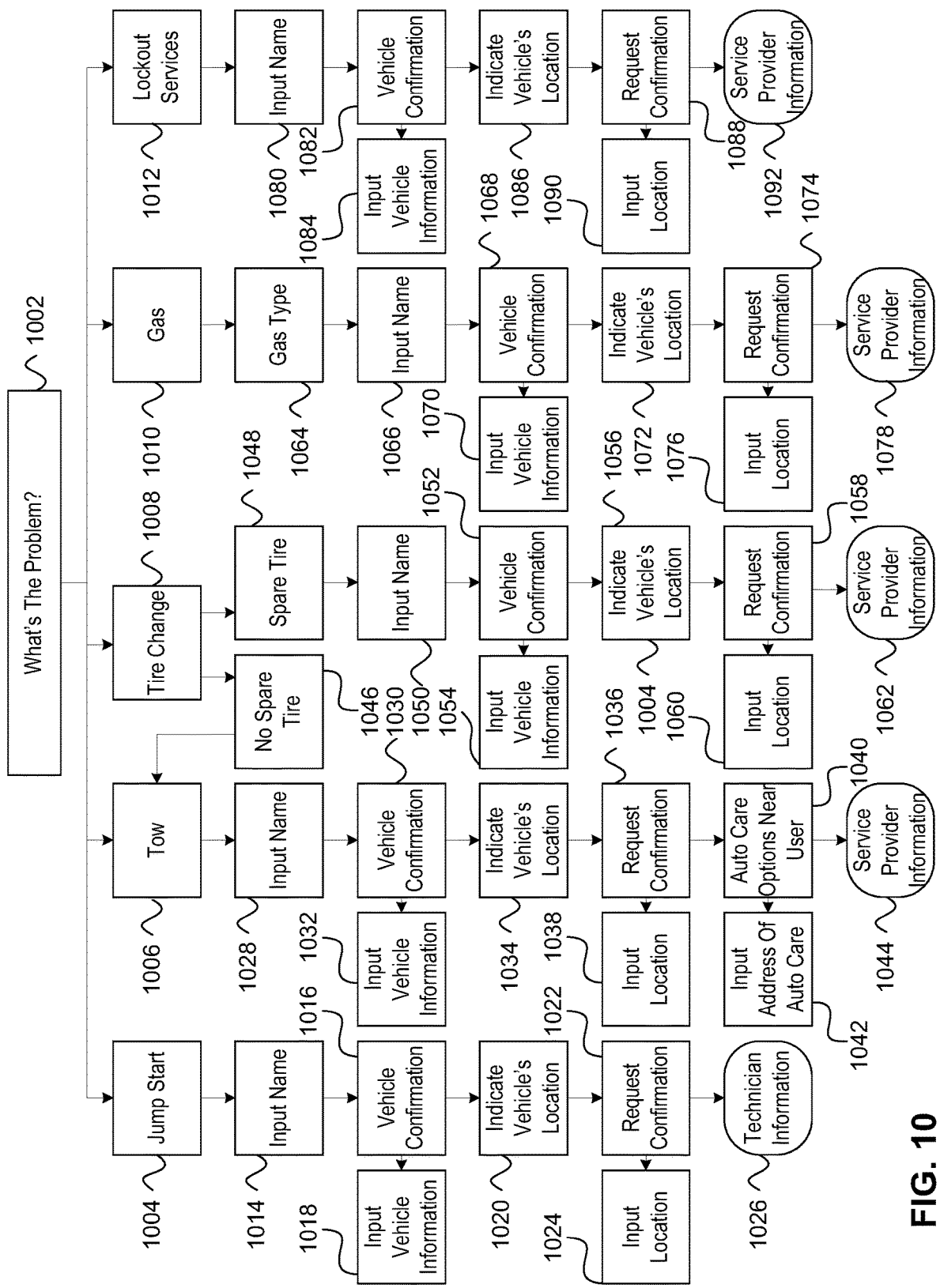
FIG. 10 depicts an illustrative support determination flowchart according to at least one embodiment described herein.

FIG. 10 depicts an illustrative decision tree diagram for determining automated support communication messages to send and/or request when communicating with a user in accordance with one or more embodiments described herein. At step 1002, a system would attempt to determine a problem being experienced by a user. For example, the system may attempt to determine the problem being experienced by a user based on one or more keywords used by the user in one or more communications between the user and the automated support system. Illustrative examples of problems that may be experienced by a user may include a need for a jump start 1004, a tow 1006, a tire change 1008, gas 1010, lockout services 1012, and/or the like.

If the user has a need for a jump start 1004, an automated support communication system may, in step 1014, request a user to provide the user's name. In step 1016, the system may confirm information about the user's vehicle. If any information about the user's vehicle is missing, the system may, in step 1018, request and receive information about the user's vehicle, and may store the information, e.g., in a user profile associated with the user. In step 1020, the system may determine a current location of the user's vehicle. In step 1022, the system may send, to the user, confirmation of the user's request. In step 1024, the system may receive an input of the user's location (e.g., to match it against an automated location received from the user's device or a device associated with the user's vehicle). In step 1026, the system may send, to the user, information regarding the technician that has accepted the user's request for help and is on the way to help the user. The information may include, for example, a name of the technician, a name of the company the technician works for, a phone number for the technician, a phone number for the company the technician works for, an estimated time of arrival of the technician, or some combination thereof.

If the user has a need for a tow 1006, an automated support communication system may, in step 1028, request a user to provide the user's name. In step 1030, the system may confirm information about the user's vehicle. If any information about the user's vehicle is missing, the system may, in step 1032, request and receive information about the user's vehicle, and may store the information, e.g., in a user profile associated with the user. In step 1034, the system may determine a current location of the user's vehicle. In step 1036, the system may send, to the user, confirmation of the user's request. In step 1038, the system may receive an input of the user's location (e.g., to match it against an automated location received from the user's device or a device associated with the user's vehicle). In step 1040, the system may determine one or more auto care options near the user (e.g., based on comparing the user's location to a database of locations of auto care options). In step 1042, after determining the one or more auto care options near the user, the system may store the address and/or other information associated with the one or more auto care options near the user. In step 1044, the system may send, to the user, information regarding the technician that has accepted the user's request for help and is on the way to help the user. The information may include, for example, the one or more auto care options near the user, a name of the technician, a name of the company the technician works for, a phone number for the technician, a phone number for the company the technician works for, an estimated time of arrival of the technician, or some combination thereof.

If the user has a need for a tire change 1008, the system may determine if the user has a spare tire in the vehicle or not. In step 1046, if the user does not have a spare tire, the system may determine that the user needs a tow and proceed to step 1006, as described above. Alternatively, in step 1048, if the user has a spare time, the system may proceed to step 1050. In step 1050, an automated support communication system may request a user to provide the user's name. In step 1052, the system may confirm information about the user's vehicle. If any information about the user's vehicle is missing, the system may, in step 1054, request and receive information about the user's vehicle, and may store the information, e.g., in a user profile associated with the user. In step 1056, the system may determine a current location of the user's vehicle. In step 1058, the system may send, to the user, confirmation of the user's request. In step 1060, the system may receive an input of the user's location (e.g., to match it against an automated location received from the user's device or a device associated with the user's vehicle).

In step 1062, the system may send, to the user, information regarding the technician that has accepted the user's request for help and is on the way to help the user. The information may include, for example, a name of the technician, a name of the company the technician works for, a phone number for the technician, a phone number for the company the technician works for, an estimated time of arrival of the technician, or some combination thereof.

If the user has a need for gas 1010, an automated support communication system may, in step 1064, determine a gas type (e.g., unleaded, diesel) used by the user's vehicle. The system may, e.g., determine the user's vehicle gas type by looking up the gas type of the user's vehicle in a profile associated with the user, by using information (e.g., a vehicle identification number (VIN) from a profile associated with the user, and/or by requesting the user to provide information regarding the gas type. In step 1066, the system may request the user to provide the user's name. In step 1068, the system may confirm information about the user's vehicle. If any information about the user's vehicle is missing, the system may, in step 1070, request and receive information about the user's vehicle, and may store the information, e.g., in the user profile associated with the user. In step 1072, the system may determine a current location of the user's vehicle. In step 1074, the system may send, to the user, confirmation of the user's request. In step 1076, the system may receive an input of the user's location (e.g., to match it against an automated location received from the user's device or a device associated with the user's vehicle). In step 1078, the system may send, to the user, information regarding the technician that has accepted the user's request for help and is on the way to help the user. The information may include, for example, a name of the technician, a name of the company the technician works for, a phone number for the technician, a phone number for the company the technician works for, an estimated time of arrival of the technician, or some combination thereof.

If the user has a need for lockout services 1012, an automated support communication system may, in step 1080, request a user to provide the user's name. In step 1082, the system may confirm information about the user's vehicle. If any information about the user's vehicle is missing, the system may, in step 1084, request and receive information about the user's vehicle, and may store the information, e.g., in a user profile associated with the user. In step 1086, the system may determine a current location of the user's vehicle. In step 1088, the system may send, to the user, confirmation of the user's request. In step 1090, the system may receive an input of the user's location (e.g., to match it against an automated location received from the user's device or a device associated with the user's vehicle). In step 1092, the system may send, to the user, information regarding the technician that has accepted the user's request for help and is on the way to help the user. The information may include, for example, a name of the technician, a name of the company the technician works for, a phone number for the technician, a phone number for the company the technician works for, an estimated time of arrival of the technician, or some combination thereof.

Figure 11:
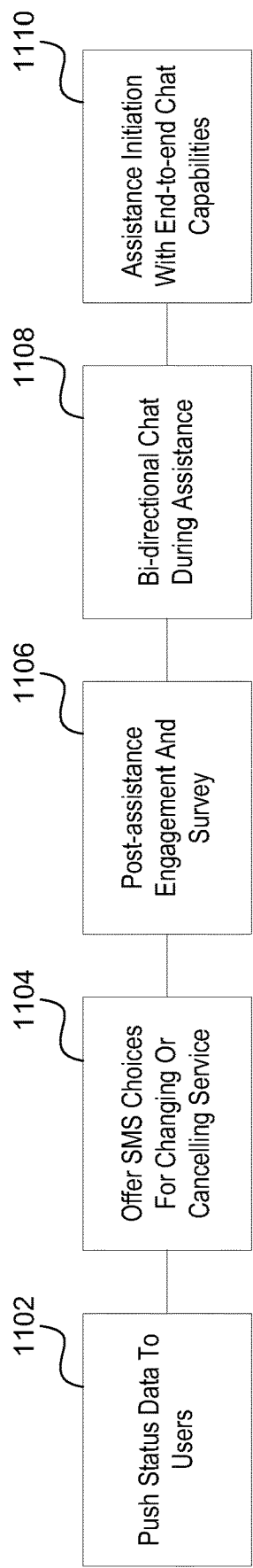
FIG. 11 depicts an illustrative phased rollout for implementing automated support communications according to at least one embodiment described herein.

FIG. 11 depicts an illustrative development diagram for a phased development rollout of an automated support communications system. For an organization that has an existing support communications system in place, a phased development rollout may aid in smoothing a transition to or integration of an automated support communications system. In each phase, the automated support communication system may include one or more features of previous phases, as well as features of the current phase.

In phase 1102, the automated support communications system may push status data to users. The system may push the status data to users via text message, phone call, email, a smartphone app, or the like. The automated support communications system may measure different communication styles of different users, and use that information for maximum impact. The different communication styles may include a preferred method of communication (e.g., text message vs. phone call vs. email vs. in-app alerts). The different communication styles may include a language, dialect, style (e.g., formal, informal, hip, edgy, stiff), or the like.

In phase 1104, the automated support communications system may offer SMS choices for changing or cancelling service. For example, the automated support communications system may allow the user to change or cancel a service request, a feature of the customer's plan or coverage, the customer's entire plan or coverage, or the like. The automated support communications system may study inbound customer messaging content (e.g., neural network learning), and adapt one or more automated communications of the automated support communications system (e.g., language, dialect, style) based on the inbound customer messaging content.

In phase 1106, the automated support communications system may provide post-assistance engagement and/or survey. For example, the automated support communications system may follow up with the user within a threshold amount of time after the user has received assistance to make the user feel valued, and/or determine how the user feels about the assistance experience. The automated support communications system may learn one or more preferred times to communicate with the user post-assistance, and adapt the threshold amount of time after the user has received assistance accordingly. A preferred threshold amount of time after the user has received assistance may vary from user to user, so a particular user's preferred threshold amount of time after the user has received assistance may be stored in a database and associated with the user (e.g., in a user profile associated with the user).

In phase 1108, the automated support communications system may provide bi-directional chat during assistance. Bi-directional chat may allow the automated support communications system to adaptively respond to the user's ongoing concerns, emotions, and needs, rather than simply sending automated updates to the user. For example, if a user sends a message asking for a status update on the user's assistance request, the automated support communications system may send a status update to the user, and/or adjust a schedule for sending status updates to the user. The automated support communications system may iterate on language nuances and user preferences (e.g., provide different automated support communications depending on nuances in the language used by the user, provide different automated support communications depending on user preferences associated with or expressed by the user).

In phase 1110, the automated support communications system may automatically initiate assistance, as well as include end-to-end chat capabilities. As part of automatically initiating assistance, the automated support communications system may receive a message or in-app request from a user for assistance, and may initiate an assistance request without requiring approval or intervention of a customer support representative. Similarly, providing end-to-end chat capabilities (e.g., chat support for an entire range of support requests, rather than only a subset of support requests) may reduce or eliminate a need for intervention of a customer support representative. These features may improve the efficiency of a support system, such as by reducing the computing power needed, e.g., for customer support representative devices, phones, and the like. The automated support communications system may tune a data push model and/or a user-request conversation model. These models may be used to determine language (e.g., vocabulary, dialect, style, phrasing) used in automated support communications, and match the language to preferences of a particular user.

Figure 12:
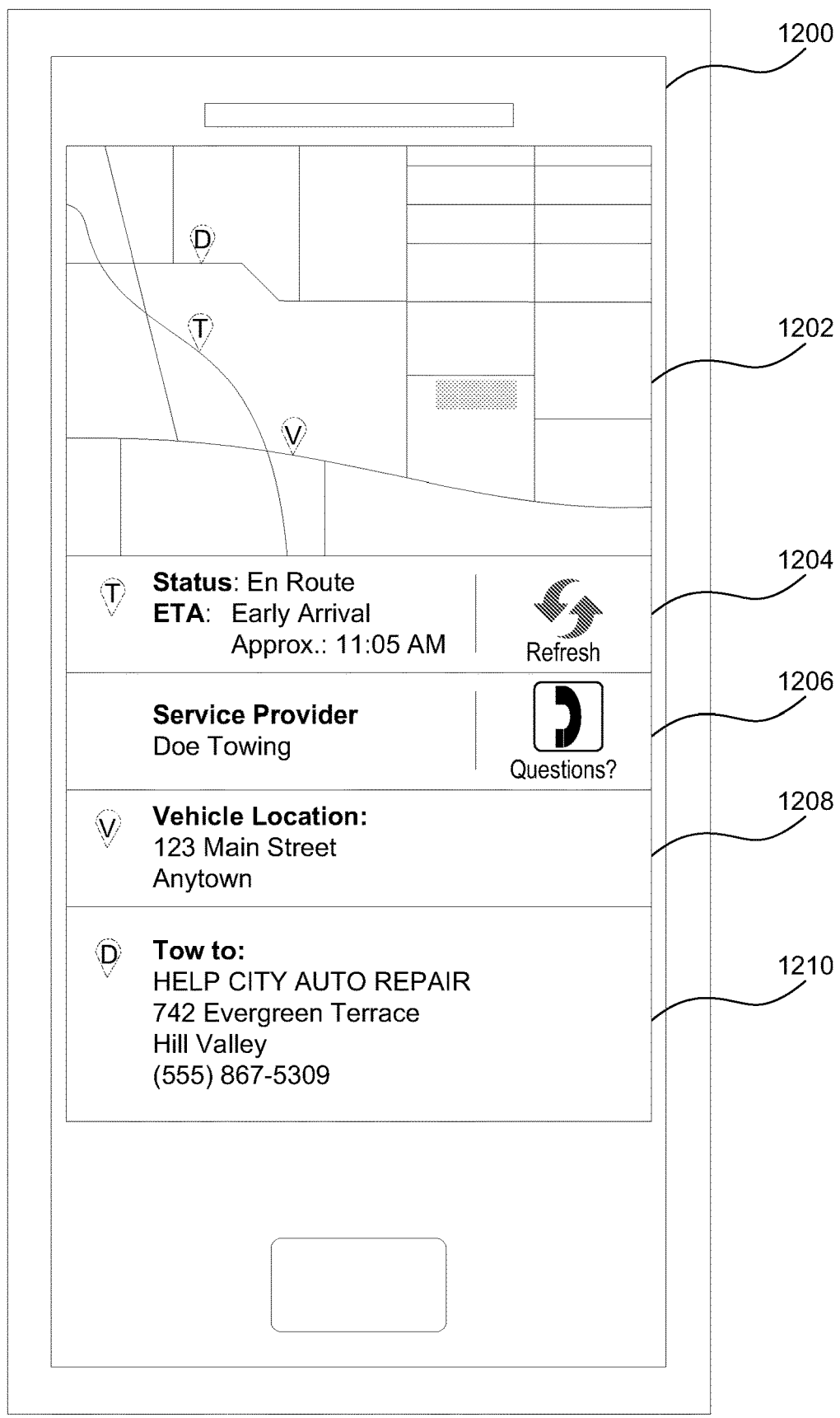
FIG. 12 depicts an illustrative user application graphical user interface for automated support communications according to at least one embodiment described herein.

FIG. 12 depicts an illustrative graphical user interface 1200 for an application that may be used in conjunction with automated support communications (e.g., text messages), or that may be used to directly provide automated support communications. The application may visualize assistance-related information and events. The application may receive and display textual communication updates, and may also provide a visualization of updates that summarizes information for ease of use. The graphical user interface 1200 may include a mobile design, and may be accessible from e.g., a web-accessible smartphone. The graphical user interface 1200 may provide different information depending on a type of assistance the user requested. For example, the graphical user interface 1200 may display different information for a user's request for a tow than for a user's request for gas or lockout assistance.

The graphical user interface 1200 may include a map 1202 that displays context associated with a rescue event, such as a user's vehicle location, a location of one or more assistance vehicles, and/or a location of one or more nearby repair shops. The graphical user interface 1200 may include a status 1204, which may include a current status of the repair technician, as well as an estimated time of arrival of the repair technician. The graphical user interface 1200 may allow the user to request refreshed or updated information regarding the current status of the repair technician. The graphical user interface 1200 may include 1206 information regarding a service provider that was dispatched to help the user. The graphical user interface 1200 may provide one-click options for calling the service provider, e.g., in case questions arise. The graphical user interface 1200 may include vehicle location information 1208, which may indicate a current location of the user's vehicle. If the displayed vehicle location information is incorrect, the graphical user interface 1200 may allow the user to provide corrected information, which the automated support communications system may use to update the user's support request, to redirect the dispatched support technician, or the like. The graphical user interface 1200 may provide repair shop information 1210, if applicable to the user's assistance request. For example, if the user has requested a tow, the repair shop information 1210 may provide information about where the user's vehicle will be towed to. If the displayed repair shop information is incorrect, the graphical user interface 1200 may allow the user to provide corrected information, which the automated support communications system may use to update the user's support request, to redirect the dispatched support technician, or the like.

FIG. 13 depicts an illustrative graphical user interface 1300 that a support representative may use in conjunction with an automated support communications system. An automated support communications system may, e.g., based on one or more keywords used by a user, determine that a customer support representative would be able to better assist a user. For example, if the user uses a trigger keyword associated with a dangerous or life-threatening situation, or a trigger keyword associated with a lack of understanding by the user, the automated support communications system may transfer the user's support request to a customer support representative. In one or more embodiments, the automated support system may continue to provide automated support communications in tandem with the support provided by the customer support representative.

Graphical user interface 1300 may include a list 1302 of current support requests from users. Each current support request may include an indication (e.g., an icon) that the support request needs high-priority attention, an indication user has sent a communication that requires a response (e.g., an amount of time that has elapsed since the user sent the most recent communication), a company that the user is affiliated with (e.g., a vehicle assistance group) to receive vehicle assistance, a type of support requested, and/or an identification of the user. After a current support request is resolved, request may be removed from the list 1302. The list 1302 may be automatically refreshed according to an interval (which may be a frequent interval, e.g., a half second, one second, two second, to give the appearance of real-time updating).

Graphical user interface 1300 may include a communications window 1304 that displays historical communications exchanged with the user. Graphical user interface 1300 may receive a selection of one of the current support requests in list 1302, and may open a corresponding communications window 1304 that corresponds to the selected current support request in list 1302. List 1302 may indicate which current support request is currently selected (e.g., by bolding, highlighting). In one or more embodiments, a transcript of a text message conversation between an automated support communications system and a user mobile device may be sent to an interface associated with a customer-support device (e.g., graphical user interface 1300), and the transcript may be displayed in communications window 1304. This may allow a customer-support representative to easily see the information that has already been provided to the customer, as well as to see the information the customer has already provided to the support system. By having this information, the customer-support representative may avoid being repetitive to the customer, and thereby provide an improved support experience for the customer. Communications window 1304 may include one or more contact options that the customer-support representative may use for interacting with the user. For example, if the user sent a communication that does not require a response, the customer-support representative may select an "Ignore" button to ignore that communication. The customer-support representative may select a "Call" button to call the user (e.g., if the user sent a communication that indicates the customer might need to be spoken to via voice rather than text communications). Communications window 1304 may receive a textual message and send the message to the user after selection of the "Send" button.

Graphical user interface 1300 may include a service-request detail window 1306. Service-request detail window 1306 may display information associated with a current support request (e.g., a selected current support request in list 1302). Service-request detail window 1306 may receive input editing information regarding the service request details. For example, if the user sends information pertaining to the user's support request (e.g., the user prefers a different service provider, the user no longer needs service, the user needs additional service), a customer-support representative may update the service-request details accordingly.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   obtaining one or more images of an item, the one or more images captured using one or more cameras;
   identifying a damaged area of the item using the one or more images;
   obtaining depth data of the damaged area of the item, the depth data captured using one or more lasers;
   identifying a type of damage to the damaged area by mapping a depth of damage to the damaged area using the depth data;
   generating damage information based on the type of damage;
   receiving a request for roadside assistance for the type of damage;
   receiving first location information comprising a user device location and second location information comprising a vehicle location;
   initiating roadside assistance in response to the request for roadside assistance; and
   sending, to a user device, a message comprising status information regarding the request for roadside assistance to cause the user device to output a graphical user interface that indicates the status information.

2. The method of claim 1, wherein the graphical user interface displays a map associated with the request.

3. The method of claim 2, wherein the map includes one or more of the user device location, the vehicle location, a location of one or more assistance vehicles, and a location of one or more nearby repair shops.

4. The method of claim 1 further comprising determining an estimated time of arrival for a repair technician, wherein the graphical user interface indicates the estimated time of arrival.

5. The method of claim 1, wherein the graphical user interface displays information associated with a service provider responding to the request.

6. The method of claim 1, further comprising sending instructions to cause a support representative device to output a support representative graphical user interface, wherein the support representative graphical user interface displays a list of support requests from a plurality of users.

7. The method of claim 6, wherein the support representative graphical user interface include a communications window that displays historical communications.

8. A computing device comprising:
   a natural language processing system;
   at least one processor; and
   memory storing executable instructions that, when executed by the at least one processor, cause the computing device to:
      obtain one or more images of an item, the one or more images captured using one or more cameras;
      identify a damaged area of the item using the one or more images;
      obtain depth data of the damaged area of the item, the depth data captured using one or more lasers;
      identify a type of damage to the damaged area by mapping a depth of damage to the damaged area using the depth data;
      generate damage information based on the type of damage;

receive a request for roadside assistance for the type of damage;

receive first location information comprising a user device location and second location information comprising a vehicle location;

initiate roadside assistance in response to the request for roadside assistance; and send, to a user device, a message comprising status information regarding the request for roadside assistance to cause the user device to output a graphical user interface that indicates the status information.

9. The computing device of claim 8, wherein the graphical user interface displays a map associated with the request.

10. The computing device of claim 9, wherein the map includes one or more of the user device location, the vehicle location, a location of one or more assistance vehicles, and a location of one or more nearby repair shops.

11. The computing device of claim 8, wherein the executable instructions, when executed, cause the computing device to:

determine an estimated time of arrival for a repair technician, wherein the graphical user interface displays the estimated time of arrival.

12. The computing device of claim 8, wherein the graphical user interface displays information associated with a service provider responding to the request.

13. The computing device of claim 8, wherein the executable instructions, when executed, cause the computing device to:

send instructions to cause a support representative device to output a support representative graphical user interface, wherein the support representative graphical user interface displays a list of support requests from a plurality of users.

14. The computing device of claim 13, wherein the support representative graphical user interface include a communications window that displays historical communications.

15. One or more non-transitory computer-readable media storing executable instructions that, when executed, cause a system to:

obtain one or more images of an item, the one or more images captured using one or more cameras;

identify a damaged area of the item using the one or more images;

obtain depth data of the damaged area of the item, the depth data captured using one or more lasers;

identify a type of damage to the damaged area by mapping a depth of damage to the damaged area using the depth data;

generate damage information based on the type of damage;

receive a request for roadside assistance for the type of damage;

receive first location information comprising a user device location and second location information comprising a vehicle location;

initiate roadside assistance in response to the request for roadside assistance; and send, to a user device, a message comprising status information regarding the request for roadside assistance to cause the user device to output a graphical user interface that indicates the status information.

16. The one or more non-transitory computer-readable media of claim 15, wherein the graphical user interface displays a map associated with the request.

17. The one or more non-transitory computer-readable media of claim 16, wherein the map includes one or more of the user device location, the vehicle location, a location of one or more assistance vehicles, and a location of one or more nearby repair shops.

18. The one or more non-transitory computer-readable media of claim 15, wherein the executable instructions, when executed, cause the system to:

determine an estimated time of arrival for a repair technician, wherein the graphical user interface displays the estimated time of arrival.

19. The one or more non-transitory computer-readable media of claim 15, wherein the graphical user interface displays information associated with a service provider responding to the request.

20. The one or more non-transitory computer-readable media of claim 15, wherein the executable instructions, when executed, cause the system to:

send instructions to cause a support representative device to output a support representative graphical user interface, wherein the support representative graphical user interface displays a list of support requests from a plurality of users.

* * * * *